Aug. 20, 1940.  W. W. MORRAL ET AL  2,212,071
MACHINE FOR CUTTING CORN FROM THE COB
Filed Dec. 24, 1936  9 Sheets-Sheet 1
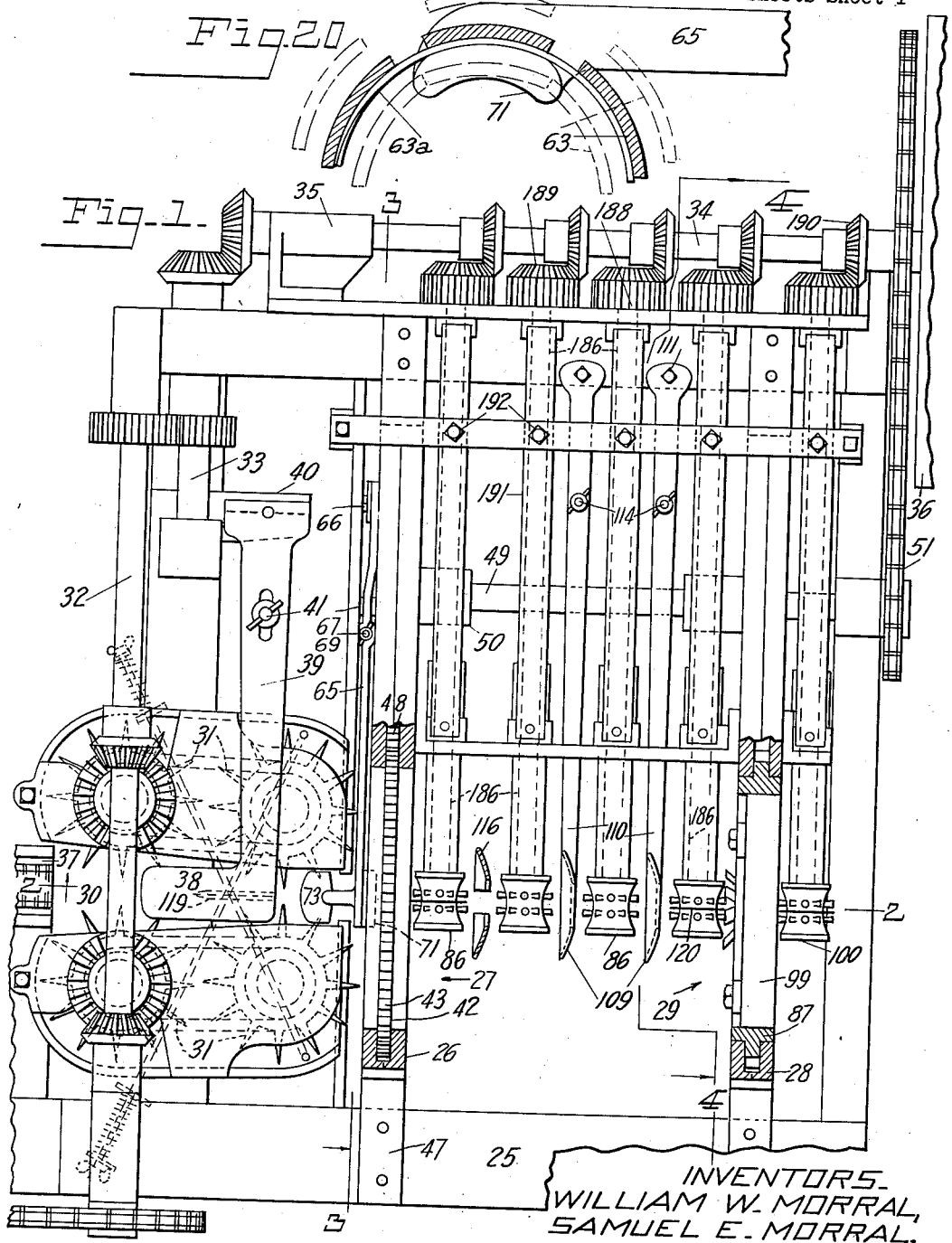
INVENTORS
WILLIAM W. MORRAL,
SAMUEL E. MORRAL.
by
Edward H. Reed
their ATTORNEY Aug. 20, 1940.  W. W. MORRAL ET AL  2,212,071
MACHINE FOR CUTTING CORN FROM THE COB
Filed Dec. 24, 1936  9 Sheets-Sheet 2
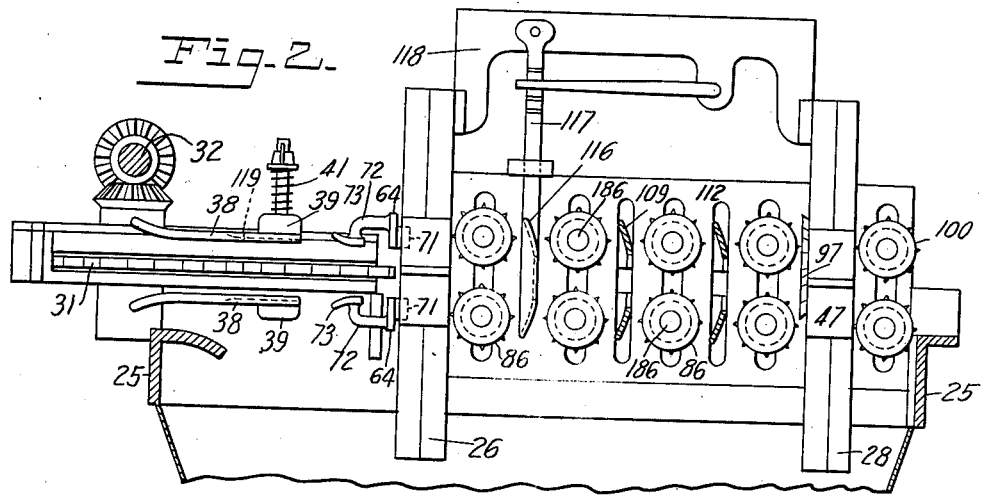
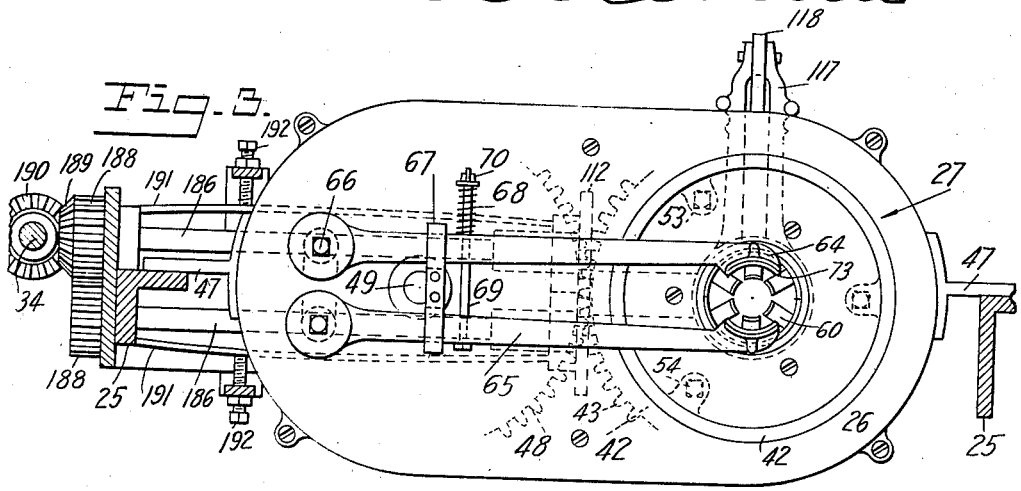
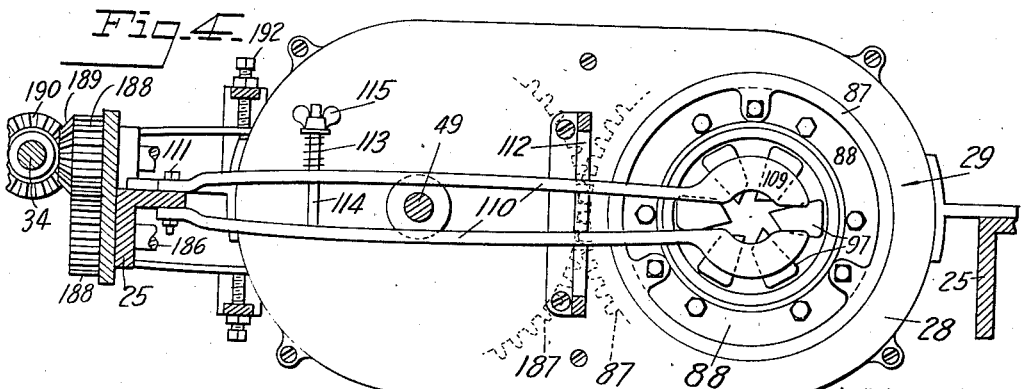
INVENTORS.
WILLIAM W. MORRAL, SAMUEL E. MORRAL.
by
their ATTORNEY.

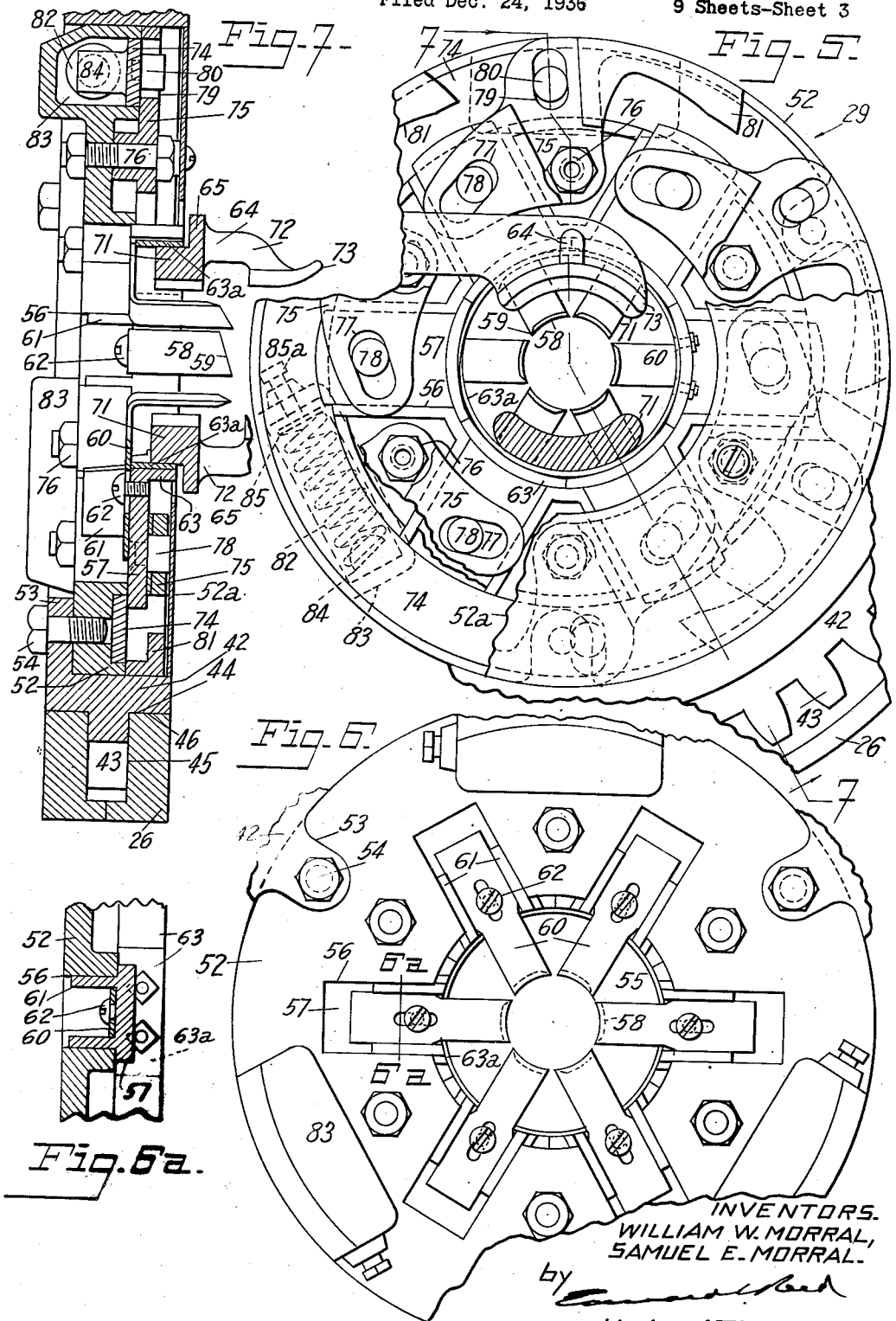

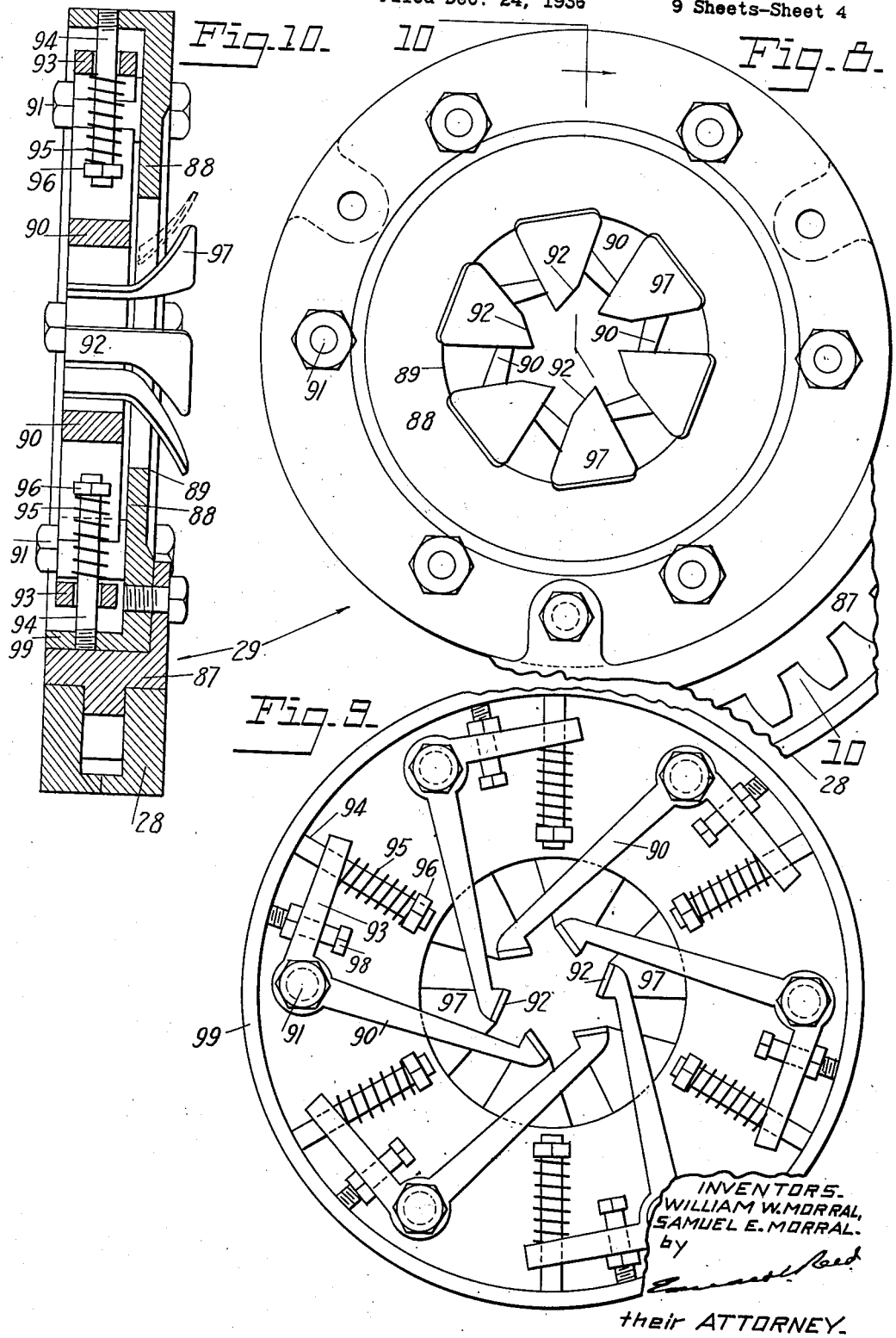

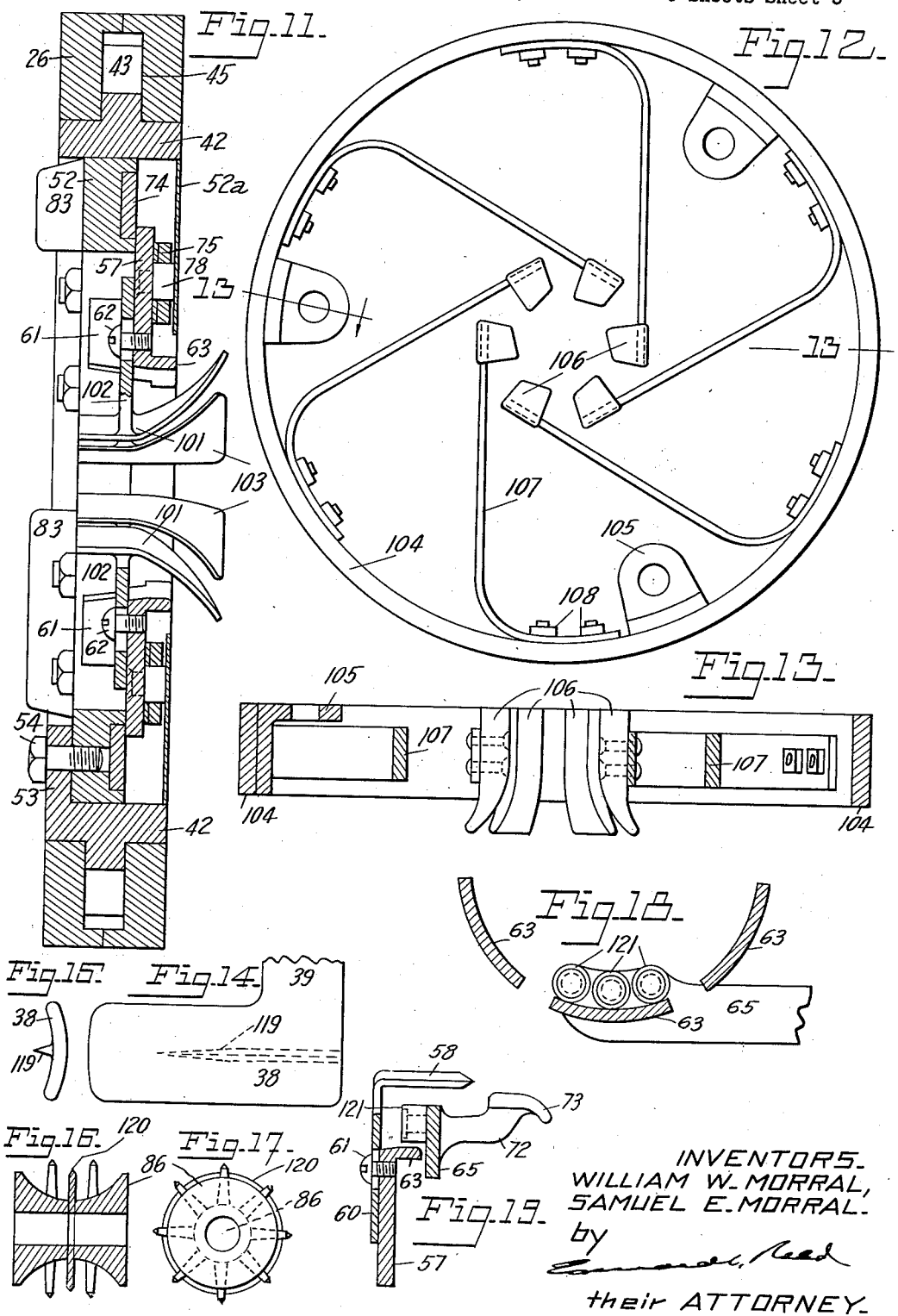

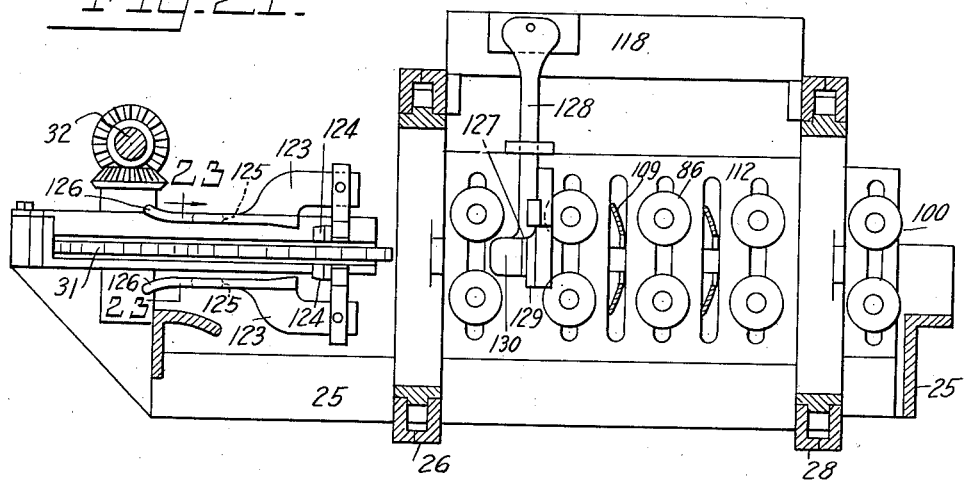
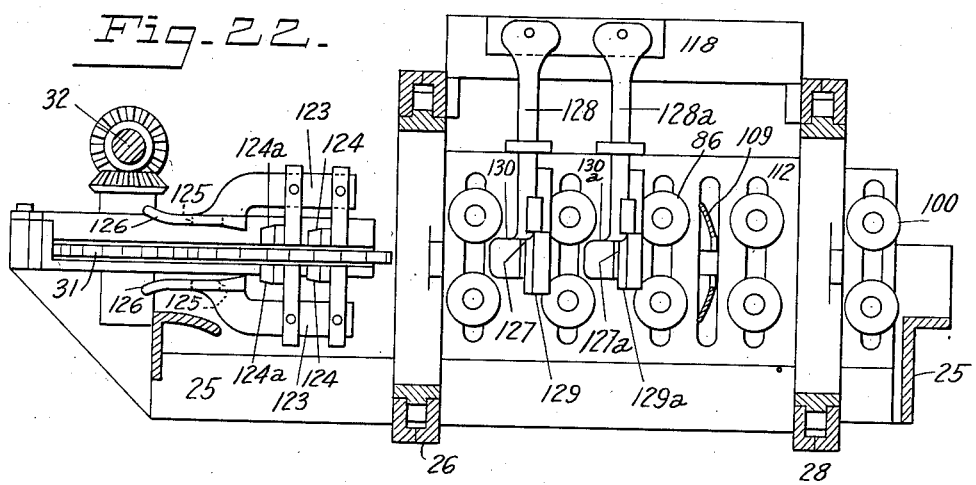
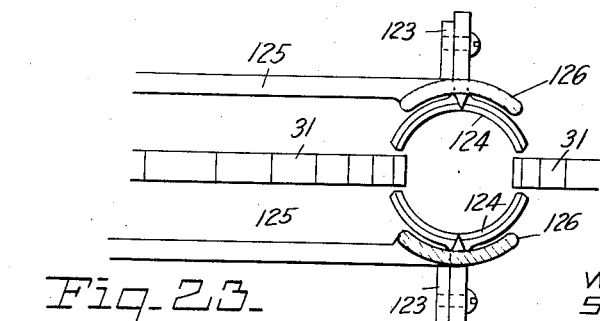

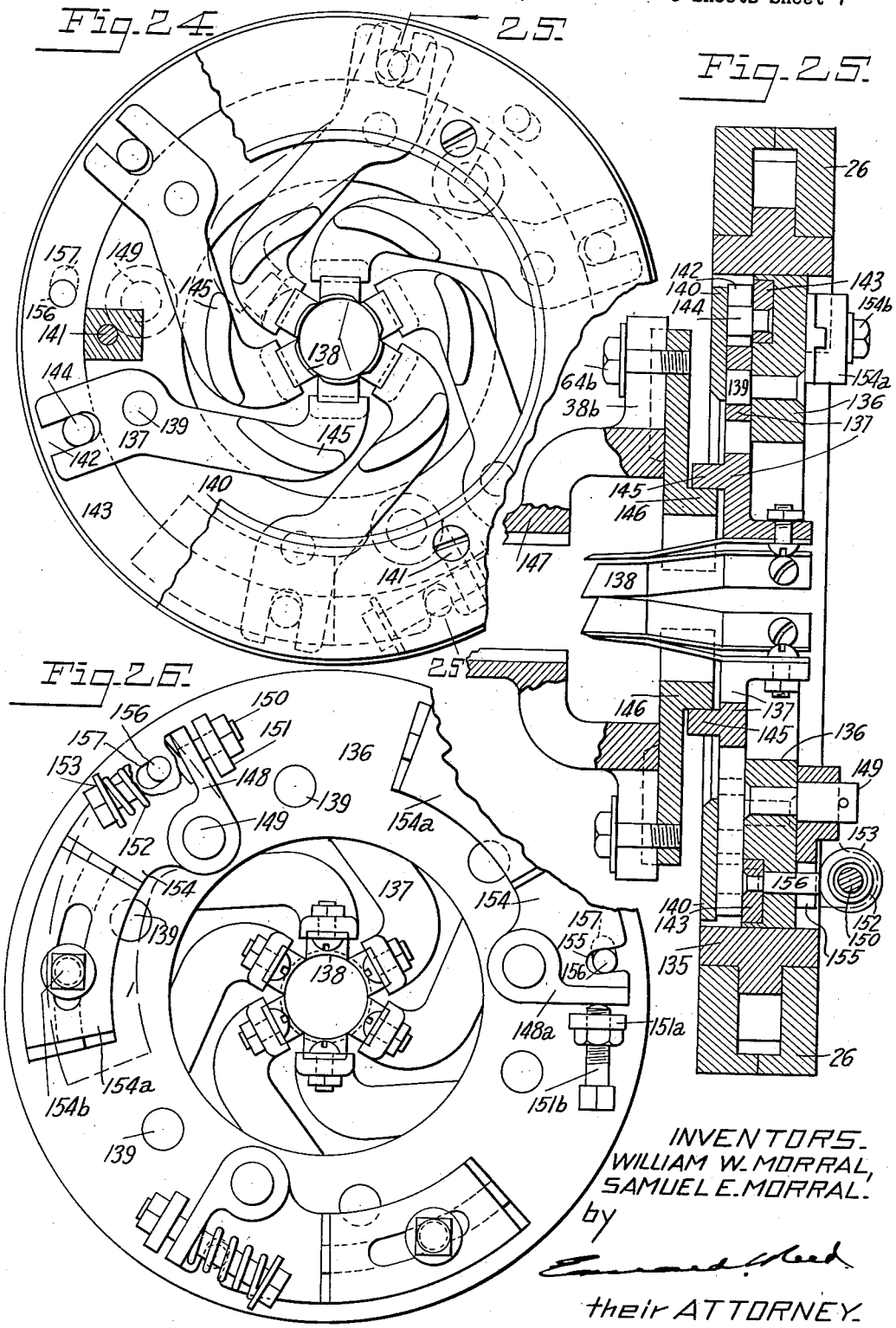

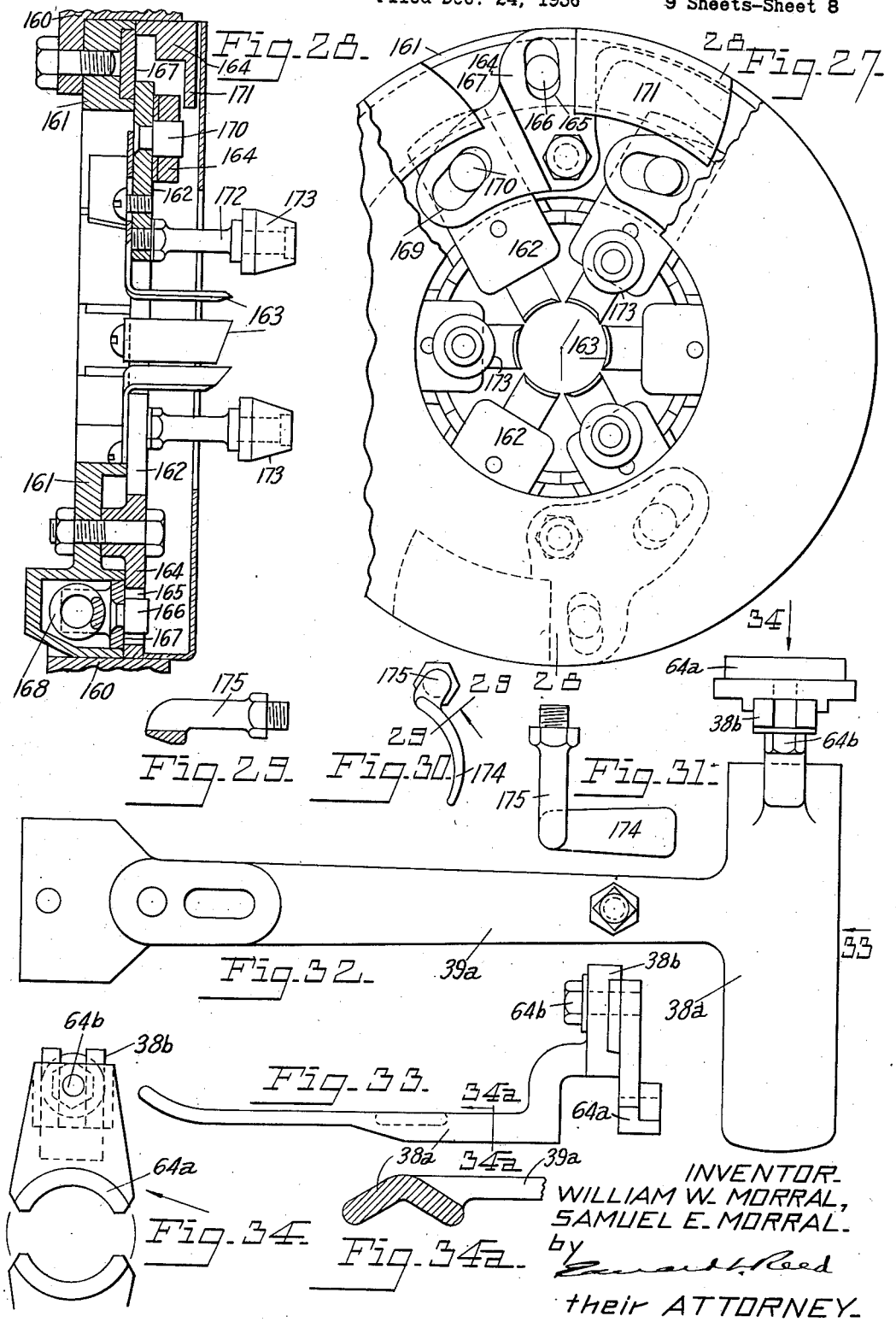

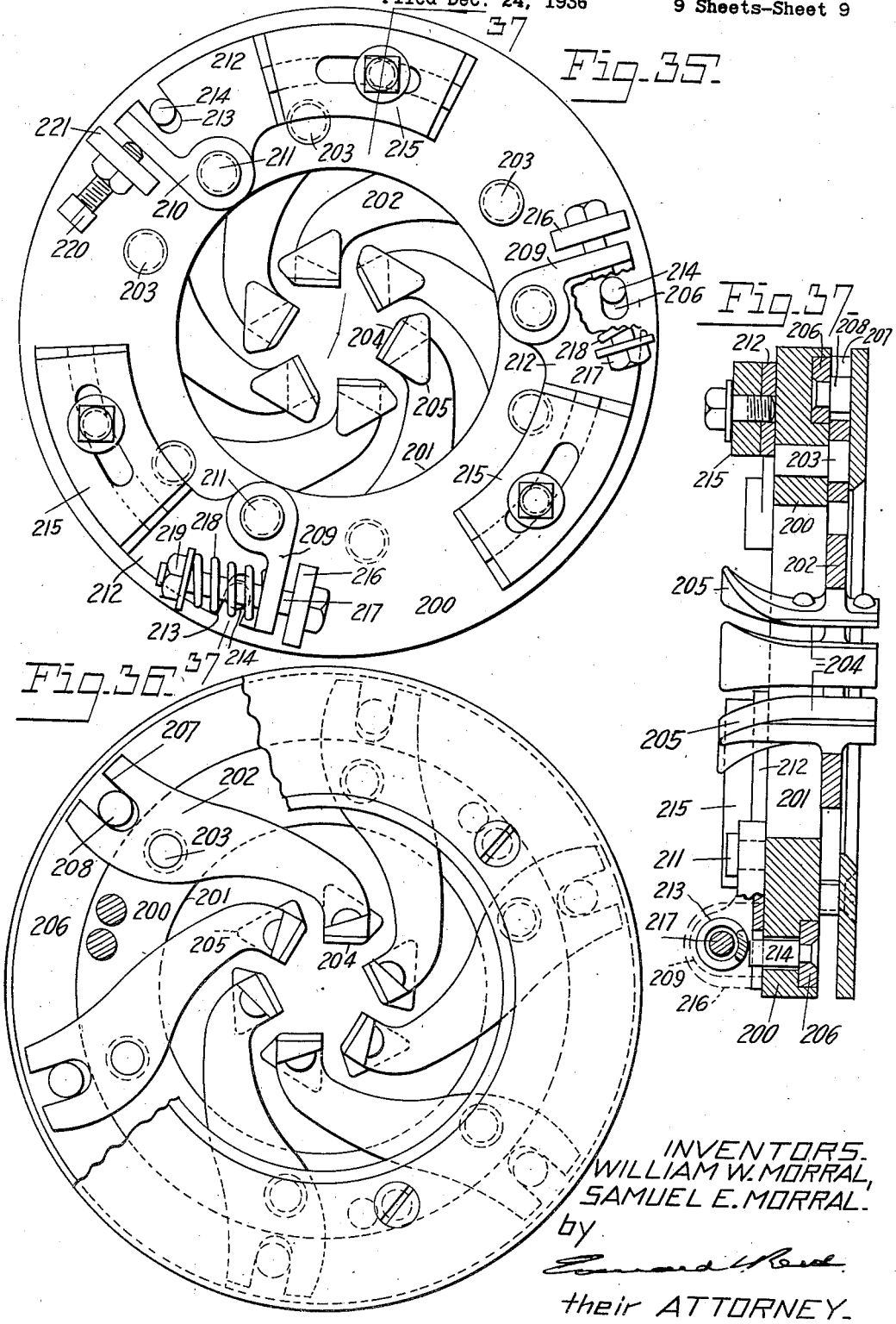

Patented Aug. 20, 1940

2,212,071

UNITED STATES PATENT OFFICE 2,212,071

MACHINE FOR CUTTING CORN FROM THE COB

William W. Morral and Samuel E. Morral, Morral, Ohio

Application December 24, 1936, Serial No. 117,456

20 Claims. (Cl. 130—9)

This invention relates to a machine for cutting green corn from the cob and one object of the invention is to provide such a machine which will remove substantially the whole grain from the cob and will then scrape the cob and remove such of the residue of the grains as may be of value.

A further object of the invention is to provide such a machine with a rotary cutter which will sever the whole grains without mutilating the same. While rotary cutters have been used heretofore they have for the most part at least been of such a character as to crush or otherwise mutilate the grains.

A further object of the invention is to provide a rotary cutter with means for automatically controlling the positions of the blades in accordance with the diameter of the ear of corn which is to be cut, which will not crush or otherwise injure the grains of corn.

A further object of the invention is to provide such a machine with a rotary scraper which will effectively remove the residue of the grains without removing any portion of the cob; and which may be used with or without preliminary stationary scrapers.

A further object of the invention is to provide such a rotary scraper with means for automatically spreading the blades to permit the entrance of cobs of different sizes.

A further object of the invention is to provide a combination machine which may be operated with either a rotary cutter for cutting whole grain corn or with stationary cutters for cutting cream style corn, and having means for interchangeably supporting said cutters thereon.

Other objects of the invention will appear as the machine is described in detail.

In the accompanying drawings Fig. 1 is a plan view of a corn cutting machine embodying our invention, partly broken away; Fig. 2 is a vertical sectional view of such a machine, taken on the line 2—2 of Fig. 1; Fig. 3 is a transverse sectional view taken on the line 3—3 of Fig. 1, looking in the direction of the arrows; Fig. 4 is a transverse sectional view taken on the line 4—4 of Fig. 1, looking in the direction of the arrows; Fig. 5 is a front elevation of the rotary cutter head, partly broken away; Fig. 6 is a rear elevation of the rotary cutter head, partly broken away; Fig. 6a is a sectional detail view taken on the line 6a—6a of Fig. 6; Fig. 7 is a sectional view of a rotary cutter head taken on the line 7—7 of Fig. 5 and partly broken away; Fig. 8 is a front elevation of the rotary scraper head, partly broken away; Fig. 9 is a rear elevation of the rotary scraper head with the gear removed; Fig. 10 is a sectional view taken on the line 10—10 of Fig. 8; Fig. 11 is a sectional view of a modified form of rotary scraper head; Fig. 12 is a rear elevation of another modified form of rotary scraper head; Fig. 13 is a sectional view taken on the line 13—13 of Fig. 12; Fig. 14 is a detail view of one of the guide members, showing the blade to hold the ear against rotation; Fig. 15 is an end elevation for that guide member; Fig. 16 is a sectional view of one of the feed wheels provided with a circumferential blade to hold the ear against rotation; Fig. 17 is an end elevation of the feed wheel of Fig. 16; Fig. 18 is a detail view showing a modified form of spreader for the rotary cutter blades; Fig. 19 is a sectional detail view showing the modified spreader of Fig. 18; Fig. 20 is a detail view showing one of the spreaders in operative relation to the slide blocks; Fig. 21 is a longitudinal sectional view similar to Fig. 2, showing stationary cutters substituted for the rotary cutter; Fig. 22 is a longitudinal sectional view of a modification of the mechanism shown in Fig. 21; Fig. 23 is a section taken on the line 23—23 of Fig. 21; Fig. 24 is a front elevation, partly broken away, of a modified form of cutter head; Fig. 25 is a sectional view taken on the line 25—25 of Fig. 24; Fig. 26 is a rear elevation, partly broken away, of the cutter head of Fig. 24; Fig. 27 is a front elevation, partly broken away, of another modification of the cutter head; Fig. 28 is a section taken on the line 28—28 of Fig. 27; Figs. 29, 30 and 31 are detail views of a modified form of ear engaging member for use with the cutter head of Fig. 28; Fig. 32 is a plan view of a combined guide and spreader; Fig. 33 is a side elevation of the combined guide and spreader; Fig. 34 is a rear elevation of the same; Fig. 34a is a section taken on the line 34a—34a of Fig. 33; Fig. 35 is a front elevation of another form of scraper head; Fig. 36 is a rear elevation of the same, partly broken away; and Fig. 37 is a section taken on the line 37—37 of Fig. 35.

In these drawings we have, for the purpose of illustration, shown one form of machine embodying our invention, together with certain modifications thereof, and have shown the machine as comprising a main frame 25 on which the various parts of the mechanism are mounted. This frame may be of any suitable form and as illustrated has an upper skeleton portion substantially rectangular in outline. Mounted on this main frame is a transverse or supplemental frame 26 adapted to support a rotary cutter head, indicated as a whole by the reference numeral 27. Also mounted on the main frame, to the rear of the supplemental frame 26, is a second transverse or supplemental frame 28 adapted to support a rotary scraper, indicated as a whole by the reference numeral 29. The forward portion of the machine, in front of the supplemental frame 26, is provided with a guideway 30 along which the ears of corn are moved to the cutter by means of a suitable feeding device. This feeding device may be of any suitable character and that here shown is of a well known construction and comprises toothed wheels 31 arranged on opposite sides of the guideway 30 to engage the ears and move the same to the cutter. These toothed wheels are rotated by a shaft 32 journaled on the main frame and connected by a countershaft 33 with a main driving shaft 34 mounted in suitable bearings 35 carried by one side of the main frame, this drive shaft being shown as provided with a belt pulley 36. The ears of corn may be fed to the guideway 30 by hand or by suitable mechanism, such as a conveyor 37. The upper and lower walls of the guideway 30 are formed in part, at least, by guide members 38 extending lengthwise thereof and yieldably supported so that they may accommodate themselves to ears of different sizes. These guide members are carried by laterally extending arms 39 mounted at a point remote from the guideway on a supporting member or bracket 40, the mounting being of such a character that the arms may have limited pivotal movement. The guide members are pressed one toward the other by a spring 41 acting on the arms 39.

The rotary cutter head 27 is mounted on the transverse frame 26 in axial alinement with the guideway 30 so that the ears of corn will be fed by the feeding device 31 between the blades of the cutter. In the construction here shown the cutter head comprises an annular gear 42 having a circumferential series of gear teeth 43 arranged substantially midway between the lateral edges thereof and the exterior lateral portions of the periphery of the gear constitute bearing surfaces 44. The supplemental frame 26 is provided with an inner circumferential groove 45 to receive the teeth 43 of the gear and on opposite sides of that groove is provided with bearing surfaces 46 to engage and co-act with the bearing surfaces 44 of the gear. To this end the frame member 26 is in the form of a flat housing divided vertically into two parts which are rigidly connected one to the other but which can be separated one from the other to permit the insertion and removal of the rotary cutter head, and is supported at its ends by brackets 47 which are mounted upon the main frame 25. The bearing surfaces 46 of the supplemental frame are somewhat more than semi-circular in form and fit snugly about the gear so as to support the same for rotation about a fixed axis. These bearing surfaces terminate above and below the horizontal diameter of the gear, at one side of the latter, to permit the gear to mesh with a second or driving gear 48 which is mounted within the housing of the supplemental frame 26 and is rigidly secured to a longitudinal shaft 49 which is mounted in bearings 50 on the two supplemental frames. This shaft is driven from the main shaft 34 and, as here shown, is connected with that shaft by a sprocket chain 51.

Carried by the gear 42 and preferably arranged within the same is a supporting member 52 which may be an integral part of the gear structure or may be a separate part detachably secured to the gear. It is here shown as a circular plate and the annular gear is provided with lugs 53 which overlap this plate and are rigidly secured thereto by screws 54, whereby the supporting member and the parts carried thereby may be readily removed from the gear. The supporting member 52 has a central opening 55 and is provided with a plurality of blade carriers, the blades supporting parts of which are movable toward and from the axis of the cutter head. As shown in Figs. 5, 6 and 7 the blade carriers are slidably mounted on the supporting member and for this purpose the supporting member may be provided with a plurality of substantially radial guideways 56 arranged about the opening therein. Mounted in each guideway is a blade carrier, such as a slide block 57, to which is rigidly secured a blade 58. Each blade extends substantially parallel with the axis of the cutter head and projects a short distance in front of the supporting member where it is provided with a cutting edge 59. At its rear end each blade has a radial shank 60, which may, if desired, be formed integral therewith and which is rigidly secured to one of the slide blocks 57. In the present construction each slide block is provided with flanges 61 which extend rearwardly into the guideway, while the outer end of the block projects beyond the outer end of the guideway, and the shank 60 of the blade fits snugly between these flanges so that it is held against lateral displacement, thereby enabling each blade to be secured to its slide block by a single screw 62.

The several blades are arranged about the axis of the cutter head and means are provided for positioning the same at a distance from said axis determined by the diameter of the ear to be cut. For this purpose each blade carrier is provided with a part constituting a contact member adapted to cooperate with suitable means for controlling the positions of the carrier and its blade. This contact member is preferably offset from the body of the carrier and is here shown as a forwardly extending flange 63 having its inner surface curved about an axis substantially coincident with the axis of the cutter head. In the present construction the several blade carriers are yieldable held normally in their innermost positions and the position controlling means acts, either directly or indirectly, on the curved contact members thereof to press the same outwardly against the action of this yieldable means and to limit their inward movement thereby. This controlling means is mounted independently of the cutter head and is non-rotatable so that it does not tend to crush or otherwise mutilate the grains of corn. Preferably it comprises two spreading members 64 arranged on opposite sides of the path of the ear and supported by laterally extending arms 65 (Fig. 3) which are pivotally mounted on the supplemental frame 26 at points remote from the path of the ear, as shown at 66. These arms are held against lateral movement by slotted guides 67 and are pressed one toward the other by a spring 68 which is coiled about one end of a bolt 69 extending loosely through the arm 65 with its head in engagement with the lower arm and its upper end projecting beyond the upper arm, the spring being confined between the upper arm and the adjustable nut 70 on the bolt. Each spreading member 64 comprises a part 71 extending rearwardly from the arm 65 to act on the contact members and, in the present instance, this part has a curved contact surface to act on the curved surfaces of the contact members and thus functions as a cam. Each spreading member also comprises a forwardly extending part 72 having at its forward end a shoe 73 arranged to engage an ear of corn in advance of the blades and serve as an actuating device to control the movements of the parts 71 in accordance with the diameter of the ear of corn. It will be apparent that when the slide blocks are in their innermost positions the spreading members will also be in their innermost positions and the ear of corn engaging the actuating shoes 73 will move the spreading member apart, thus causing the parts 71 thereof to press the slide blocks outwardly as the cutter head rotates about the spreading device, thereby locating the blades in their proper positions to sever the whole grains of corn from the cob.

In Figs. 1 and 2 we have shown the spreading members 64 as separate from the guides 38 and supported by a separate pair of arms 65 but this is not an essential and the spreading members may be combined with the guides and the combined structure supported by a single pair of arms, as shown in Figs. 32 to 34. In these figures each guide 38a is carried by an arm 39a mounted and controlled in the same manner as the arms 39. Preferably each guide is V-shaped in cross section to more effectively center the ears with relation to the cutters. The spreading member 64a is carried by the rear end of the guide, which is of such a length as to properly locate the spreading member with relation to the cutter head. Preferably the spreading member is detachably secured to the guide and as here shown the latter is provided with a slotted bracket 38b to which the spreading member is adjustably secured by a screw 64b.

It will be noted that the spreading device is provided with a space or opening through which the cut corn may drop as it leaves the cutters, thus preventing the choking of the cutters. This is preferably accomplished by providing a space between the ear engaging part and the part which acts on the blade carriers. As shown in Fig. 7, the part 72, which carries the shoe 73, is secured to the supporting arm 65 at a point spaced from the inner surface of the part 71, so as to leave a space between the shoe 73 and the part 71. In the combined arrangement shown in Fig. 33, the bracket 38b is spaced outwardly from the ear engaging surface of the guide 38a so as to leave a space between the end of the guide and the spreading member 64a. We prefer that the spreading device shall comprise two spreading members, as shown, but this is not essential and a single spreading member may be used, as the blade carriers are so connected, as hereinafter described, that the movement of one blade carrier will cause similar movements to be imparted to all the carriers.

The contact surfaces of the flanges 63 of the blade carriers are described about a radius of an intermediate length, that is, about a radius having a length greater than the distance between the contact surfaces and the axis of the cutter head when the blade carriers are in their innermost positions and of a length less than said distance when the blade carriers are in their outermost positions. Consequently when the blade carriers are in intermediate positions, and the blades are adjusted for ears of an average size, the curved contact surfaces will be arranged in true circular relation one to the other and will ride smoothly over the spreading members, the contact surfaces of which are curved about the same radius as the contact surfaces of the slide block. (See Fig. 20.) When the slide blocks are located in their innermost or their outermost positions the track formed by the contact surfaces thereof will be slightly deformed but this will not be sufficient to interfere with the operation of the spreader.

However, for the purpose of providing a smooth continuous track for engagement with the spreading members a resilient track member 63a may be interposed between the cooperating surfaces of the blade carriers and spreading members, as shown in Figs. 5, 7 and 20. This track member is preferably circular in form and is here shown as a split ring, the tapered ends of which overlap to permit the expansion of the track without interrupting the continuity thereof. This expansible track member is secured to one of the blade carriers so that it will rotate with the cutter head and as the spreading members move outwardly they will expand the track member against the contact members of the blade carriers and cause the latter to move outwardly.

It is desirable that the blades should be maintained in equally spaced relation to the axis of the cutter head and we have therefore provided means for causing the several blade carriers to move in unison. In the construction shown in Figs. 5, 6 and 7 an annular member, such as a flat ring 74, is slidably mounted on the supporting member or plate 52 for limited movement about the axis of that plate and each slide block is so connected with that annular member that the radial movement of any one of the several slide blocks will impart movement to the annular member which in turn will cause the other slide blocks to be moved like distances. In the arrangement here shown a bell crank lever 75 is pivotally mounted on the supporting member adjacent to each slide block, as shown at 76. One arm of this lever extends across the slide block and has a slot 77 to receive a stud 78 on the slide block. The other arm extends across the annular member 74 and has a slot 79 to receive a stud 80 on the annular member. The slots are so arranged that the radial movement of any one slide block will rock the corresponding lever about its axis, thus causing the lever to impart movement to the annular member which movement will be transmitted to the other slide blocks. Means are provided for resisting the outward movement of the blades, by centrifugal force or otherwise, and thus maintaining the blades and their carriers in proper cutting relation to the ear of corn. This may be accomplished by counterbalancing the blades and their carriers so as to maintain an approximate centrifugal balance, as by means of weights or springs or both. In the present instance we have employed a combination of springs and weights for this purpose. Each lever has a weighted portion 81 extending rearwardly, with relation to its direction of rotation, and serving as a balancing member to resist any tendency of the slide blocks to move outwardly by centrifugal force when the cutter head is rotated at high speed, and this weighted portion may, if desired, be adjustable, as shown in Fig. 26. The annular member or ring 74 is yieldably pressed in a direction to move the slide blocks inwardly by springs 82. There are, in the present instance, three of these springs and they are arranged in housings or pockets 83 carried by the supporting member 52. Lugs 84 carried by the annular member 74 extend into these housings and each spring 82 is confined between the lug 84 and an adjustable stop 85 at the other end of the housing, the position of which is controlled by a screw 85a. The front of the cutter head may, if desired, be provided with an annular cover plate 52a to enclose the mechanism mounted thereon.

After the ear has passed the cutter and the grains have been severed therefrom it is fed by suitable feeding devices to the rotary scraper 29 which removes therefrom such residue of the grains as remains attached to the cob. This feeding means may be of any suitable character but, as shown in Figs. 1 to 3, it comprises a plurality of pairs of toothed wheels 86, carried by relatively long shafts 186 having at their outer ends intermeshing gears 188 and one of them also having a beveled gear 189 meshing with a corresponding beveled gear 190 on the drive shaft 34. The shafts are mounted in the frame 25 but have sufficient play therein to permit of a slight pivotal movement which, however, is not sufficient to disengage the teeth of the gears 188. Flat springs 191, attached at their outer ends to the frame, have their inner ends engaging the shafts to press the feed rollers one toward the other and the pressure exerted by these springs on the shafts is controlled by adjusting screws 192. There may be any suitable number of pairs of feed wheels, this depending in part at least upon the distance between the cutter and the scraper. One pair of feed wheels is located close to the rear side of the rotary cutter to withdraw the ear therefrom after the rear end thereof has passed out of engagement with the feeding device 31.

The rotary scraper also comprises an annular gear 87 (Figs. 4, 8 and 10) rotatably mounted in the supplemental frame 28 in the same manner that the gear of the rotary cutter is mounted in the supplemental frame 26, the gear meshing with a driving gear 187 also mounted in the housing of the supplemental frame member 28 and rigidly secured to the shaft 49. Mounted within and rigidly secured to the gear 87 is a supporting member or plate 88 having a central opening 89. Pivotally mounted on the rear side of the supporting plate 88 are a plurality of arms or levers 90, here shown as mounted on pivot screws 91. The arms 90 extend inwardly from the pivotal mountings and each is provided at its inner end with a scraper blade 92 which extends forwardly through the opening 89 in the plate and is preferably of such a character as to have a scraping action rather than a cutting action. Rigidly secured to each arm 90, near the axis thereof, and extending at an angle thereto, is a second arm 93 having an opening near the free end thereof through which extends a substantially radial pin 94. A spring 95, coiled about the pin and confined between the arm 93 and a nut 96 on the pin, tends to move the arms 90—93 in a direction to move the scrapers toward the axis of the scraper head. The several blades 92 are arranged about the axis of the scraper and each blade is so arranged that one edge will contact with the cob of the ear, as shown in Fig. 8, and will scrape the pulp and other residue of the grains from the cob. The forward ends of the blades are flared, as shown at 97 in Fig. 10, to guide the end of the cob between the blades and to force the blades outwardly against the action of the springs 95, so as to accommodate them to cobs of different sizes. If desired, each arm 93 may be provided with a set screw 98 arranged to engage the flange 99 of the supporting plate and thus limit the inward movement of the blades. A pair of feed wheels 100 are arranged beyond the scraper to withdraw the ears therefrom after they have passed beyond the last pair of feed wheels 86.

The rotary scraper may take various forms and in Fig. 11 we have shown the scraping blades of such a character that they can be substituted for the cutting blades in the rotary cutter head, thereby enabling such head to be utilized either for cutting or scraping. As there shown, each blade 101 has a substantially radial shank 102 adapted to be secured to the slide block 57 in the same manner that the cutter blades is secured thereto, it being only necessary to remove the screw 62 and substitute the shank of the scraper blade for the shank of the cutter blade. Otherwise the construction and operation is the same, except that the spreader is omitted and the blades have their outer ends flared, as shown at 103, so that they are moved against the action of the springs and their positions controlled by the direct action of the cobs on the blades.

In Figs. 12 and 13 we have shown a further modification of the scraper in which the head comprises an annular supporting member or flat ring 104 having lugs 105, by which it may be secured to the gear. The scrapers 106 are carried by the inner ends of resilient arms 107, the outer ends of which are rigidly secured to the inner surfaces of the annular supporting member, as shown at 108. The resiliency of the arms tends to move the blades inwardly and they are forced outwardly by the contact of the cob therewith.

It is usually desirable to provide means for effecting a preliminary scraping of the cob before the latter is delivered to the rotary scraper 29 which performs the final scraping operation. For this purpose one or more scrapers may be interposed between the cutter 27 and the scraper 29. For this preliminary scraping we prefer to use stationary scrapers, that is, scrapers that are non-rotatable, as these are much less expensive and operate satisfactorily for the preliminary scraping operation. As shown in Figs. 1 and 2 a plurality of stationary scrapers are interposed between adjacent feed wheels 86. While these scrapers are stationary in the sense that they are non-rotatable each scraper comprises two members arranged on opposite sides of the path of the cob and movable toward and from each other to accommodate them to the size of the cob. Preferably each member of the stationary scraper comprises substantially half of a circular disk which is dished on its forward side and provided in its inner edge with a recess conforming substantially to the curvature of the cob. These scraper members are carried by relatively long arms which are mounted on the frame at points remote from the scraper members and which are capable of yielding movement to permit the scraper members to accommodate themselves to the size of the cob. Inasmuch as the scraper members do not extend entirely about the cob it is desirable that successive scrapers should be differently arranged so that all sides of the cob will be scraped. As shown in Fig. 4 the scraping members 109 are arranged respectively above and below the path of the cob and are carried by arms 110 which are mounted on that side of the main frame remote from the scrapers. The arms are here shown as connected with a main frame by a bolt 111 but the connection is sufficiently loose to permit of a limited pivotal movement of the arms. The arms extend through a slotted guide 112, which holds them against lateral displacement, and are pressed toward each other by a spring 113 which is coiled about the upper portion of a bolt 114 extending through the two arms, the tension of the spring being adjusted by a nut 115 against which it bears. The two members of the scraper 109 engage the upper and lower surfaces of the cob and in order to scrape the sides of the cobs a similar scraper is arranged in a vertical position, as shown at 116 in Figs. 1 and 2. The arms 117 of this scraper extend vertically and are connected to a longitudinal frame member 118 in substantially the same manner as the arms 110 are connected with the main frame.

As an ear is fed through the machine the grains are first cut therefrom by the rotary cutter, a preliminary scraping of the cob is effected by the stationary scrapers and the cob is then delivered to the rotary scraper which effects a final and complete scraping of the cob. Ordinarily the feeding devices will hold the ear against rotation when it is engaged by the rotary cutter or scraper but, if desired, means may be provided to positively hold the ear against rotation. For this purpose one of the guide members 38, in advance of the rotary cutter, may have on its inner surface a longitudinal blade or sharp rib 119 which will bite into the ear as it approaches the cutter and hold the ear against rotation, as shown in Figs. 2, 14 and 15. Likewise one of the feed wheels 86 in advance of the rotary scraper may be provided with a circumferential blade 120 which bites into the ear and holds it against rotation. (Figs. 1, 16 and 17.)

If desired, the spreading members, for spreading the cutter blades, may be provided with antifriction rolls and, as shown in Figs. 18 and 19, the arms 65 which carry the spreader members have mounted thereon a series of rollers 121 arranged to engage the flanges 63 of the slide blocks 57, or the expansible track 63a, these rollers being arranged in a slightly curved path to conform to the curvature of the flanges.

Green corn is usually packed, or canned, in two styles, one the whole grain corn and the other the cream style corn, the latter having the grains cut in relatively small pieces and the crushing of the grains is less objectionable than it is in the whole grain corn. The operator will pick out the larger or more perfect ears for the whole grain style of corn and will use the smaller ears or nubbins and the less perfect ears for the cream style corn. The rotary cutter is preferable for cutting whole grain corn because it removes the whole grains without crushing or mutilating the same but it is often desirable to use a stationary cutter for cutting the cream style corn because the machine can be operated to feed the corn at a greater speed with the stationary cutter than is practical with the rotary cutter and the small ears or nubbins do not tend to choke up or clog the stationary cutter as much as they do the rotary cutter. For that reason the present machine is a combination machine and is so constructed that rotary cutters and stationary cutters may be interchangeably used thereon. As will be apparent from the foregoing description of the rotary cutter the cutter head as a whole may be removed by separating the two parts of the housing of the supplemental frame 26, or the supporting plate 52 may be removed from the gear, and we have shown in Figs. 21 and 22 a stationary cutting device which may be readily substituted for the rotary cutter head. The particular cutting device shown in Figs. 21 and 22 is of a type well known in the art and there are preferably at least two pairs of cutters, one pair operating on the upper and lower portions of the ear and the other pair operating on the opposite sides of the ear, so as to remove the grains about the entire circumference of the ear. In the arrangement shown in Fig. 21 two blade supporting members 123 are arranged above and below the path of the ear in advance of the supplemental frame 26 and mounted on these supporting members are blades 124 which are curved about the ear in a well known manner. The blade supporting members are carried by laterally extending arms 125 which are adapted to be pivotally mounted on the bracket or stud 40 which supports the arms 39 for the guide members 38, as shown in Fig. 1, the arms 39 and guides 38 being removed when it is desired to use the stationary cutters. The arms are yieldable, in the manner which has been described, to permit the blades to be adjusted according to the diameter of the ear. Each blade supporting member 123 has a forwardly extending portion 126 which serves both to guide the ear into engagement with the blades and to position the blades according to the diameter of the ear. Arranged in the rear of the supplemental frame 26 are other blade supporting members 127 also carried by relatively long arms 128. Blades 129 are carried by the arms 128 and arranged on opposite sides of the path of the ear. Each blade supporting member 127 has a forwardly extending portion 130 to engage the ear and properly position the blades with relation thereto. When this stationary cutter is to be applied to the machine the first stationary scraper is removed and the stationary cutter substituted therefor, the arms 128 being secured to the upper frame member 118. When this first stationary scraper is a vertical scraper one of the horizontal scrapers may, if desired, be removed and the vertical scraper substituted therefor. When the stationary cutters have been substituted for the rotary cutter the machine is operated as before with the exception that the grains are severed by forcing the same against the stationary blades instead of revolving the blades about the ear. The rotary scraper may be used or any suitable scraper may be substituted therefor. By providing a combination machine of this kind the operator is able readily to change from one type of cutter to the other and to cut his corn to the best advantage without the necessity of buying two machines. In the arrangement shown in Fig. 22 the front supporting members 123 have been lengthened and provided with a second pair of cutters 124a and a second pair of cutters 127a have been added beyond the rear cutters 127 and are supported by a separate pair of arms 128a. The cutters of the two pairs of cutters are spaced different distances from the cob of the ear so as to cut the grains in small pieces as is desired in cream style corn. Otherwise the construction and operation are the same as in Fig. 21.

In Figs. 24, 25 and 26 we have shown a modified form of cutter head in which the blade carriers are mounted for pivotal movement instead of sliding movement. As there shown, the cutter head comprises a gear 135 mounted on the supplemental frame member 26, as above described, and having a supporting member or plate 136 rigidly secured thereto. Pivotally mounted on this plate are a plurality of pivoted blade carrying arms 137 to the inner ends of which are secured blades 138, the arms being so arranged that the several blades will be grouped about the axis of the head and will have approximately radial movement toward and from that axis. Each arm is pivotally mounted between its ends on a stud 139 which is mounted in the supporting member 136. The arm may be retained on the stud in any suitable manner but, in the present instance, an annular plate 140 is secured to the face of the supporting member by screws 141 and extends across the several arms so as to retain the same on the studs. The outer end of each arm is slotted, as shown at 142, and extends across an annular member or ring 143 which is mounted on the supporting member 136 for limited circumferential movement with relation thereto, and studs 144 rigidly mounted in this annular member extend through the slots 142 of the respective arms, the arrangement being such that this annular member will cause the several arms to move in unison about their axes, thus maintaining the blades equally spaced from the axis of the head. The blade carriers may be actuated or spread in any suitable manner to position the blades with relation to the ear of corn and to control the depth of the cut. In the present instance each carrier is provided with a forwardly extending flange 145 having an inner contact surface adapted to be acted upon by spreading members 146, which are here shown as carried by combined guide and spreading members 147 as shown in Figs. 32 and 34. An expansible track may be interposed between the spreading members and the flanges if desired. Means are provided for normally pressing the blades toward the axis of the head and for counterbalancing centrifugal force on the blades and their carriers. In the arrangement illustrated a plurality of arms 148 and 148a, in the present instance three, are pivotally mounted on studs 149 projecting rearwardly from the supporting member. Each arm has a web portion extending circumferentially of the supporting member and provided with a notch 155 into which extends a pin 156 which is rigidly secured to the annular member or ring 143 and extends through an elongate opening or slot 157 in the supporting member. Thus the connecting pins 156 and the annular member 143 provide an operative connection between the arms 148 and 148a and the blade carriers and the blade carriers are caused to move in unison about their axes. The web portion 154 of each arm is weighted to counterbalance centrifugal force exerted upon the blades and their carriers and to resist the outward movements of the blade carriers by centrifugal force. Preferably each web portion is provided with a weight 154a which is connected therewith for adjustment lengthwise thereof, as by a bolt and slot connection 154b, to enable the action of the weight on the blade carriers to be regulated. A part or all of the arms may, if desired, be spring actuated to press the blades inwardly and thus cooperate with the weights 154a in controlling the positions of the blades. In the arrangement shown in Fig. 26 the two arms 148 are spring actuated and the arm 148a functions as a stop to limit the inward movement of the blades. As there shown, an apertured lug 151 is rigidly mounted on the supporting member 136 adjacent to each of the arms 148 and a bolt 150 extends through the lug and through the opening in the arm. A spring 152 is coiled about the bolt beyond the arm and is confined between the arm and the head of the bolt and thus tends to move the blades inwardly. The tension of the spring may be regulated by adjusting the nut on the bolt. A lug 151a is secured to the supporting member adjacent the arm 148a, and a set screw 151b is adjustably mounted in the lug in the path of the arm and serves to limit the movement of the arm in a direction to move the blades inwardly. By a proper adjustment of the springs and the weights the blades and their carriers may be maintained in approximate centrifugal balance, but the springs are not essential and satisfactory results may be obtained by the use of the weights alone.

While it is usually preferable to employ non-rotating spreading devices for controlling the positions of the blades this is not essential and, if desired, spreading devices may be mounted on the cutter head for rotation therewith. In Figs. 27 and 28 we have shown a cutter head comprising a gear 160 adapted to be mounted on the supplemental frame 26 in the manner heretofore described and provided with a supporting member 161 on which are slidably mounted a plurality of blade carriers 162, to the inner ends of which are secured blades 163. Pivotally mounted on the forward side of the supporting member 161 are a plurality of bell crank levers 164 each of which has a slot 165 to receive a pin 166 on a ring 167 which is slidably mounted on the supporting member and is acted on by springs 168. The other arm of the bell crank is offset with relation to the first mentioned part thereof so as to overlap the blade carrier 162 and this part of the bell crank is provided with a slot 169 to receive a stud 170 on the blade carrier 162, thus connecting the several blade carriers one with the other, through the ring 167, to cause them to move in unison. Each bell crank is weighted at one side of its axis and this weight as here shown consists in part of a plate 171 secured to the side of the bell crank so as to overlap the adjacent blade carrier. Rigidly secured to at least a part of said blade carriers, near their inner ends, are studs 172 which project forwardly therefrom and are provided, preferably at a point in advance of the blades 163, with ear engaging members, such as rollers 173, here shown as frusto-conical in shape. These rollers are grouped about the path of the ear and arranged to engage the latter and to be moved outwardly thereby, thereby adjusting the blades according to the size of the ear. While the ear engaging members are preferably in the form of rollers, which will not crush or otherwise injure the grains, non-rotating shoes may, if desired, be substituted for the rollers 173 and in Figs. 29, 30 and 31, we have shown a curved shoe 174 which is rigidly secured to a shank 175 adapted to be mounted in the slide block in the blade carrier in substitution for the stud 172 and roller 173.

In Figs. 35, 36 and 37 there is shown another form of scraper head in which the movement of the scraper blades is controlled in substantially the same manner that the movement of the cutter blades is controlled in Figs. 24, 25 and 26. This scraper head comprises a supporting member 200 having a central opening 201 and adapted to be mounted on an annular gear in the manner shown in Fig. 25. Mounted on this supporting member, and preferably on the rear side thereof, are a plurality of blade supporting arms 202 each of which is pivotally mounted between its ends on the supporting member, as shown at 203. The inner ends of these arms project inwardly and have secured thereto scraper plates or non-cutting blades 204. The blade supporting arms are so shaped that the blades are grouped about the axis of the scraper head and arranged to have scraping contact with the cob which is moved between the blades. Suitable means are provided for adjusting the blades to the size of the cob and, in the present construction, each blade supporting arm is provided at its inner end with a shoe 205 to which the blade is secured and the forward end of which is flared so that a cob entering the space between the shoes will be centered with relation to the blades and will spread the latter a distance sufficient to permit the passage of the cob. The outer end of each blade supporting arm extends across an annular member or ring 206 which is slidably mounted on the supporting member 200 for limited circumferential movement with relation thereto, the supporting member being preferably provided with a recess to receive the annular member. The outer end of each arm is slotted, as shown at 207 to receive a stud 208 which is secured to the annular member 206 so that the several blade supporting arms will be caused to move in unison and will be maintained in equal spaced relation to the axis of the cutter head. The scraper blades are held in proper relation to the cob that is being scraped by counterbalancing means similar to that shown in Figs. 24, 25 and 26. This counterbalancing means comprises a plurality of arms 209 and 210 which are pivotally mounted on the supporting member 200, as shown at 211, and are, in the present instance, mounted on the forward side of the supporting member. Each arm is provided with a web portion 212 extending circumferentially of the supporting member and this web is provided with a slot 213 to receive a stud 214 rigidly mounted in the annular member 206 and extending through an enlarged opening or slot in the supporting member, this pin and slot connection serving to cause the annular member and arms to move in unison. A weight 215 is adjustably mounted upon the web portion of each arm and is so arranged that the action of centrifugal force thereon will cause the same to oppose the action of centrifugal force on the blade carriers and blades. Mounted on the supporting member, adjacent to each of the arms 209, is an apertured lug 216 and a bolt 217 extends through this lug and through the arm and a spring 218 confined between the arm and a nut 219 on the bolt serves to move the arm in a direction to move the blades inwardly. The arm 210 serves as a stop to limit the inward movement of the blades and for this purpose it cooperates with a set screw 220 mounted in a lug 221 on the supporting member.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent, is:

1. In a machine for cutting green corn from the cob, a rotary cutter head having a central opening, blade carriers mounted on said cutter head for movement toward and from the axis thereof, blades carried by said blade carriers and grouped about said axis, each blade carrier having a part forming a contact member, said parts of the several carriers being grouped about the axis of said cutter head, an expansible member arranged within and in contact with said group of contact members to form a continuous track, and a non-rotatable spreading device having a part acting on said expansible member to control the positions of said blades, and also having a part in advance of said blade to engage an ear of corn and adjust the first mentioned part thereof in accordance with the diameter of said ear.

2. In a machine for cutting green corn from the cob, a rotary cutter head having a central opening, blade carriers mounted on said cutter head for movement toward and from the axis thereof, blades carried by said blade carriers and grouped about said axis, each blade carrier having a part forming a contact member, said parts of the several carriers being grouped about the axis of said cutter head, a substantially circular resilient track member arranged within and in contact with said contact members, said track member being secured to one of said contact members for rotation with said cutter head and having its end portions overlapping and movable with relation one to the other, a non-rotatable spreading device having parts arranged to engage said track member and expand the same to move said blade carriers outwardly and also having parts to engage an ear of corn and adjust the first mentioned parts thereof in accordance with the diameter of said ear, and yieldable means acting on said blade carriers to resist their outward movement.

3. In a machine for cutting green corn from the cob, a rotary cutter head having a central opening and a plurality of substantially radial guideways, blade carriers slidably mounted in the respective guideways, blades carried by said carriers and grouped about the axis of said cutter head, each blade carrier having a contact surface curved about an axis substantially coincident with the axis of said cutter head, and a spreading device having parts held against rotation and provided with curved surfaces over which the curved surfaces of said blade carriers move as said head rotates, and serving to control the radial movement of said blade carriers, said spreading device also having parts arranged in advance of said blades to engage an ear of corn and position the first mentioned parts in accordance with the diameter of said ear.

4. In a machine for cutting green corn from the cob, a rotary cutter head having a central opening and a plurality of substantially radial guideways, blade carriers slidably mounted in the respective guideways, blades carried by said carriers and grouped about the axis of said cutter head, said blade carriers having parts forming contact members grouped about the axis of said cutter head, a pair of arms pivotally mounted on a stationary part of said machine with their free ends in front of said cutter head, spreader members carried by said arms and arranged to act on the contact members of said blade carriers as said cutter head rotates, and actuating members carried by said arms and arranged to engage an ear of corn and position said spreader members and said blades in accordance with the diameter of said ear.

5. In a machine for removing green corn from the cob, a rotatable member, a plurality of blade supporting arms pivotally mounted between their ends on said member and having their inner ends grouped about the axis of said rotatable member, blades carried by the inner ends of said arms, an annular member mounted on said rotatable member adjacent the outer ends of said arms for limited rotatory movement with relation to said rotatable member, pivotal connections between the outer ends of said arms and said annular member to cause said arms to move in unison, levers pivotally mounted on said rotatable member and connected with said annular member, springs acting on said levers to rotate said annular member in a direction to move the inner ends of said arms toward the axis of said rotatable member, and means adapted to be controlled by an ear of corn approaching said blades to actuate said arms and adjust said blades in accordance with the diameter of said ear.

6. In a machine for removing green corn from the cob, a rotatable head having an axial opening through which an ear of corn may be moved, a plurality of blade carriers, means for mounting said blade carriers on said head for rotation therewith and for movement toward and from the axis thereof, blades carried by the respective blade carriers and grouped about said axis, contact members rigidly secured to the respective blade carriers and grouped about said axis, yieldable means for pressing said blade carriers toward the axis of said head, a device having parts movable transversely to the axis of said head and arranged to be engaged by an ear of corn in advance of said blades and to act on said contact members to move said blade carriers against the action of said yieldable means, and means to mount said device on said machine and to hold the same against rotation about said axis.

7. In a machine for removing green corn from the cob, a rotatable head having an axial opening through which an ear of corn may be moved, a plurality of blade carriers, means for mounting said blade carriers on said head for rotation therewith and for movement toward and from the axis thereof, blades carried by the respective blade carriers and grouped about said axis, means for yieldably pressing said blade carriers toward the axis of said head and for causing the same to move in unison, each blade carrier having an arcuate flange projecting forwardly therefrom and said flanges being arranged in substantially circular formation, a device comprising a plurality of spreading members arranged to act on said flanges and control the movement of said blade carriers and each having a part to engage an ear of corn in advance of said blades, and means for mounting said device on said machine and holding the same against rotation about said axis.

8. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, counterbalancing devices pivotally mounted on said rotary member separately from said blade carriers, and means for connecting said counterbalancing devices with said blade carriers to cause said counterbalancing devices to maintain said blade carriers substantially in centrifugal balance.

9. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, an arm pivotally mounted on said rotary member independently of said blade carriers, means for connecting said arm with said blade carriers, and means acting on said arm to counteract the action of centrifugal force on said blade carriers.

10. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, weights movably mounted on said rotary member independently of said blade carriers, and means for connecting said weights with said blade carriers, said weights being arranged for movement by centrifugal force in a direction to counteract the action of centrifugal force on said blade carriers.

11. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, an annular member movably mounted on said rotary member, means for connecting said annular member with said blade carriers to cause the latter to move in unison, weighted arms pivotally mounted on that side of said rotary member opposite said annular member, said rotary member having an opening adjacent said arms, and devices connecting said arms with said annular member, said devices extending through and being movable in the openings in said rotary member to cause said weighted arms to counteract the action of centrifugal force on said blade carriers.

12. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, arms pivotally mounted on said rotary member independently of said blade carriers, means for connecting said arms with said blade carriers and causing said blade carriers to move in unison, and springs acting on said arms to move said blade carriers toward said axis and to resist the movement of said blade carriers by centrifugal force.

13. In a machine for removing green corn from the cob, a rotary head having a central opening through which an ear of corn may be moved, a plurality of blade carriers, means for mounting said blade carriers on said head for movement toward and from the axis thereof, blades grouped about the axis of said head and mounted on said carriers for movement therewith, contact members connected with said blade carriers for movement therewith, a spreading device having parts arranged to act on said contact members as said head rotates and serving to control the movement of said blade carriers, said spreading device also having parts arranged in advance of the blades to engage an ear of corn and move the first mentioned parts thereof in accordance with the diameter of said ear, means for mounting said spreading device on said machine and for holding the same against rotation about said axis, an annular member mounted on said head for rotatory movement with relation thereto, means for connecting said annular member with said blade carriers to cause the latter to move in unison, weighted levers mounted on said cutter head separately from said blade carriers, and means for connecting said levers with said annular member to oppose the action of centrifugal force on said blade carriers.

14. In a machine for removing green corn from the cob, a rotary head having a central opening through which an ear of corn may be moved, a plurality of blade carriers, means for mounting said blade carriers on said head for movement toward and from the axis thereof, blades grouped about the axis of said head and mounted on said carriers for movement therewith, contact members connected with said blade carriers for movement therewith, a spreading device having parts arranged to act on said contact members as said head rotates and serving to control the movement of said blade carriers, said spreading device also having parts arranged in advance of the blades to engage an ear of corn and move the first mentioned parts thereof in accordance with the diameter of said ear, means for mounting said spreading device on said machine and for holding the same against rotation about said axis, an annular member mounted on said head for rotatory movement with relation thereto, means for connecting said annular member with said blade carriers to cause the latter to move in unison, weighted levers mounted on said cutter head separately from said blade carriers, and means for connecting said levers with said annular member to oppose the action of centrifugal force on said blade carriers, and springs acting on said levers to rotate said annular member in a direction to move said blades toward the axis of said rotary head.

15. In a machine for removing green corn from the cob, a rotary head having an axial opening through which an ear of corn may be moved, a plurality of blade carriers pivotally mounted on said head with their inner ends arranged for movement toward and from the axis thereof and each having a part rigid therewith and forming a contact surface, blades grouped about the axis of said head and mounted on the inner ends of the respective carriers for movement therewith, a spreading device having parts arranged to act on said contact surfaces as said head rotates to control the movement of said blade carriers and also having parts arranged in advance of said blades to engage an ear of corn and move the first mentioned parts in accordance with the diameter of said ear, means for mounting said spreading device on said machine and for holding the same against rotation about the axis of said head, an annular member mounted on said head for limited movement with relation thereto, means for connecting said annular member with said blade carriers outwardly beyond the axes thereof, levers pivotally mounted on that side of said head opposite said blade carriers, means for connecting said levers with said annular member, and springs acting on said levers to move the inner ends of said blade carriers toward the axis of said cutter head.

16. In a machine for removing green corn from the cob, a rotary head having an axial opening through which an ear of corn may be moved, a plurality of blade carriers pivotally mounted on said head with their inner ends arranged for movement toward and from the axis thereof and each having a part rigid therewith and forming a contact surface, blades grouped about the axis of said head and mounted on the inner ends of the respective carriers for movement therewith, a spreading device having parts arranged to act on said contact surfaces as said head rotates to control the movement of said blade carriers and also having parts arranged in advance of said blades to engage an ear of corn and move the first mentioned parts in accordance with the diameter of said ear, means for mounting said spreading device on said machine and for holding the same against rotation about the axis of said head, an annular member mounted on said head for limited movement with relation thereto, means for connecting said annular member with said blade carriers outwardly beyond the axes thereof, levers pivotally mounted on that side of said head opposite said blade carriers, means for connecting said levers with said annular member, each of said levers being provided with a weight arranged to counteract the action of centrifugal force on said blade carriers, and spring means acting on said annular member to move the inner ends of said blade carriers toward the axis of said cutter heads.

17. In a machine for removing green corn from the cob, a rotary head having a central opening through which an ear of corn may be moved and having a plurality of substantially radial guideways, blade carriers slidably mounted in the respective guideways, blades carried by said carriers and grouped about the axis of said head, contact members carried by the respective blade carriers, a non-rotatable spreading device arranged in front of said head, means for supporting said spreading device on a fixed part of said machine independently of said cutter head, said spreading device having parts to act on said contact members to control the radial movement of said blade carriers and having other parts to engage an ear of corn in advance of said blades and position the first mentioned parts in accordance with the diameter of said ear.

18. In a machine for removing green corn from the cob, a rotatable member having a central opening through which an ear of corn may be moved and having a plurality of substantially radial guideways, slide blocks mounted in said guideways, blades carried by said slide blocks and arranged about the axis of said rotatable member, an annular member mounted about the axis of said rotatable member for limited movement with relation thereto about said axis, levers pivotally mounted on said rotatable member, means for connecting said levers with said annular member and with the respective slide blocks to cause the latter to move in unison, weights carried by the respective levers and arranged to counteract the action of centrifugal force on said slide blocks, and spring means acting on said annular member to move said slide blocks inwardly.

19. In a machine for removing green corn from the cob, a rotary head having a central opening through which an ear of corn may be moved, a plurality of blade carriers, means for mounting said blade carriers on said head for rotation therewith and for movement toward and from the axis thereof, blades carried by said blade carriers and grouped about the axis of said head, each blade carrier having an arcuate contact member rigidly secured thereto, said contact members being grouped about the axis of said head, a spreading device having radially movable parts each provided with an arcuate series of rollers arranged to act on said contact members to control the movement thereof and also having parts arranged in advance of said blades to engage an ear of corn and position said rollers in accordance with the diameter of said ear, and means for mounting said spreading device on said machine and for holding the same against rotation about the axis of said head.

20. In a machine for removing green corn from the cob, a rotary member having an axial opening through which an ear of corn may be moved, a plurality of blade carriers, means for mounting said blade carriers on said rotary member for rotation therewith and for movement toward and from the axis thereof, blades carried by the respective blade carriers and grouped about said axis, arms pivotally mounted on said rotary member independently of said blade carriers, weights adjustably mounted on said arms, means for connecting said arms with said blade carriers to cause said arms and said weights to counterbalance the action of centrifugal force on said blade carriers, and adjustable springs acting separately on the respective pivoted arms and tending to move said blade carriers toward said axis.

WILLIAM W. MORRAL.
SAMUEL E. MORRAL.